(12) United States Patent
Cassone et al.

(10) Patent No.: US 8,005,706 B1
(45) Date of Patent: Aug. 23, 2011

(54) METHOD FOR IDENTIFYING RISKS FOR DEPENDENT PROJECTS BASED ON AN ENHANCED TELECOM OPERATIONS MAP

(75) Inventors: Deandra Cassone, Overland Park, KS (US); James J. Kalny, Lenexa, KS (US); Emillia Angelova Kancheva, Silver Spring, MD (US); Noel R. Marchbanks, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 853 days.

(21) Appl. No.: 11/833,544

(22) Filed: Aug. 3, 2007

(51) Int. Cl.
*G06Q 10/00* (2006.01)
*G06Q 40/00* (2006.01)

(52) U.S. Cl. ........... 705/7.28; 705/7.11; 705/7.12; 705/7.13; 705/7.23

(58) Field of Classification Search ......... 705/7.11–7.42
See application file for complete search history.

(56) References Cited

U.S. PATENT DOCUMENTS

| | | | |
|---|---|---|---|
| 5,303,170 A | 4/1994 | Valko | |
| 5,978,811 A | 11/1999 | Smiley | |
| 6,324,647 B1 | 11/2001 | Bowman-Amuah | |
| 6,327,698 B1 | 12/2001 | Kolluru | |
| 6,349,404 B1 | 2/2002 | Moore et al. | |
| 6,446,053 B1 | 9/2002 | Elliott | |
| 6,662,357 B1 | 12/2003 | Bowman-Amuah | |
| 6,920,458 B1 | 7/2005 | Chu et al. | |
| 7,051,036 B2 | 5/2006 | Rosnow et al. | |
| 7,058,588 B2 | 6/2006 | Young et al. | |
| 7,117,161 B2 * | 10/2006 | Bruce ................................ 705/8 |
| 7,430,498 B2 | 9/2008 | Butterfield et al. | |
| 7,559,049 B1 | 7/2009 | Hemmat et al. | |
| 7,640,531 B1 | 12/2009 | Akram et al. | |
| 7,698,148 B2 * | 4/2010 | Lavu et al. ..................... 705/1.1 |
| 7,730,123 B1 * | 6/2010 | Erickson et al. ............. 709/203 |
| 7,818,288 B1 | 10/2010 | Dickson et al. | |
| 7,890,545 B1 * | 2/2011 | Cason et al. .................. 707/803 |
| 7,908,167 B1 | 3/2011 | Crum et al. | |
| 2001/0041999 A1 | 11/2001 | Young et al. | |
| 2002/0026630 A1 * | 2/2002 | Schmidt et al. | |
| 2002/0042731 A1 * | 4/2002 | King, Jr. et al. | |
| 2002/0059512 A1 * | 5/2002 | Desjardins | |
| 2002/0073078 A1 * | 6/2002 | Ku et al. | |
| 2002/0082904 A1 * | 6/2002 | Grosshart et al. | |
| 2003/0033191 A1 * | 2/2003 | Davies et al. | |
| 2003/0065663 A1 * | 4/2003 | Chu | |
| 2003/0106039 A1 | 6/2003 | Rosnow et al. | |
| 2003/0110067 A1 * | 6/2003 | Miller et al. | |
| 2003/0208367 A1 * | 11/2003 | Aizenbud-Reshef et al. | |

(Continued)

OTHER PUBLICATIONS

Hillson, David "Using a risk breakdown structure in project management" Jun. 2003, Journal of Facilities Management. Bingley: vol. 2, Iss. 1, p. 85-97.*

(Continued)

*Primary Examiner* — Scott L Jarrett
*Assistant Examiner* — Sujay Koneru

(57) ABSTRACT

A method is provided for risk management in project management. A risk is identified for a project during a concept phase for the project prior to an analysis phase for the project. A probability for an identified risk and an impact severity for the identified risk are analyzed to determine a risk exposure for the project. A risk response plan is developed based on the risk exposure. The risk exposure is mitigated by executing a portion of the risk response plan.

16 Claims, 10 Drawing Sheets

U.S. PATENT DOCUMENTS

| | | | |
|---|---|---|---|
| 2003/0225605 A1* | 12/2003 | Yokota et al. | 705/7 |
| 2004/0030992 A1* | 2/2004 | Moisa et al. | |
| 2004/0054565 A1* | 3/2004 | Nemecek et al. | 705/7 |
| 2004/0059589 A1* | 3/2004 | Moore et al. | 705/1 |
| 2004/0143811 A1* | 7/2004 | Kaelicke et al. | |
| 2005/0027582 A1* | 2/2005 | Chereau et al. | |
| 2005/0033725 A1* | 2/2005 | Potter et al. | |
| 2005/0060213 A1* | 3/2005 | Lavu et al. | 705/7 |
| 2005/0114829 A1* | 5/2005 | Robin et al. | 717/101 |
| 2005/0149370 A1 | 7/2005 | Brown | |
| 2005/0197845 A1* | 9/2005 | Wachter et al. | |
| 2005/0197952 A1* | 9/2005 | Shea et al. | 705/38 |
| 2005/0216111 A1* | 9/2005 | Ooshima et al. | |
| 2005/0251525 A1* | 11/2005 | Chu et al. | |
| 2006/0053043 A1 | 3/2006 | Clarke | |
| 2006/0095309 A1* | 5/2006 | Mangan et al. | 705/8 |
| 2006/0095906 A1* | 5/2006 | Oikawa | |
| 2006/0184371 A1* | 8/2006 | Tsalakopoulos | 705/1 |
| 2006/0190391 A1* | 8/2006 | Cullen et al. | 705/37 |
| 2006/0206368 A1* | 9/2006 | Bamberger et al. | |
| 2007/0038490 A1* | 2/2007 | Joodi | 705/7 |
| 2007/0276674 A1* | 11/2007 | Hemmat | |
| 2007/0299707 A1* | 12/2007 | Bentsen et al. | 705/7 |
| 2008/0313008 A1 | 12/2008 | Lee et al. | |
| 2008/0313596 A1* | 12/2008 | Kreamer et al. | 717/101 |
| 2009/0055237 A1 | 2/2009 | Henry et al. | |

OTHER PUBLICATIONS

"Enterprise Risk Management: Tools and Techniques for Effective Implementation" (2007) Institute of Management Accountants.*

"An introduction to Project Management" (2005) Cultural Consortium, Ltd.*

Somers, Toni M. & Nelson, Klara (2001). The Impact of Critical Success Factors across the Stages of Enterprise Resource Planning Implementations. Proceedings of the 34th Hawaii International Conference on System Sciences. Jan. 3-6, Maui.*

Project Challenge Expo, "It Governance—Value for the Business" (Sep. 2007).*

Walker, "Integration of Enterprise Architecture and Application Portfolio Management" (2007) Microsoft.*

"A comprehensive, best practices approach to business resilience and risk mitigation" (Sep. 2007) IBM.*

Zhu, Kevin, "Project Pipeling Risk Management," U.S. Appl. No. 12/348,731, filed Jan. 5, 2009.

Dickson, Thomas S., et al., "ETOM Enhancement of Functional Requirements Modeling," U.S. Appl. No. 11/491,435, filed Jul. 21, 2006.*

Marchbanks, Noel, et el., "Systems and Method for Project Management in Plan Workbook," U.S. Appl. No. 11/833,555, filed Aug. 3, 2007.*

"eTOM Overview", TM Forum—Technical Programs, http://wwwtmforum.org/browse.asp?, Jan. 2006, pp. 1-2.*

Gordijn, JAAP, et al., "e3-value : Design and Evalution of e-Business Models," IEEE Intelligent Systems, Specical Issue on Intelligent e-Business, Apr. 2001.

International Telecommunication Union (ITU-T) "Series M: TMN and Network Maintenance: International Transmission Systems, Telephone Circuits, Telegraphy, Facsimile and Leased Circuits; Telecommuncations Management Network, Enhanced Telecom Operations Map (eTOM)—The Business Process Framework," Jun. 2004.

Markovits, Shmuel, et al., "Information Modeling of Trouble: A Service Provider View," 8th International Conference on Telecommuncations —ConTEL 2005.

Milham, Dave, et al., "How Can the eTOM®Framework Help Service Providers in Today's Marketplace?, " TELECOM Italia, Torino, Italy, 2004.

Pateli, Adamantia, "A Framework for Understanding and Analysing eBusiness Models," 16th Bled eCommerce Conference, eTransformation, Bled, Slovenia, Jun. 9-11, 2003.

Project Management Institute, "A Guide to the Project Management Body of Knowledge Third Edition (PMBOK®Guide)," Project Management Institute, Inc., Newtown Square, Pennsylvania, 2004.

Smith, Dennis, et al., "A Roadmap for Enterprise Integration, " IEEE Computer Society, Proceedings of the 10th International Workshop on Software Technology and Engineering Practice (STEP '02), 2002.

Office Action dated Jun. 20, 2008, U.S. Appl. No. 11/491,435, IDF 3414 (4000-33400).

Final Office Action dated Nov. 14, 2008, U.S. Appl. No. 11/491,435, IDF 3414 (4000-33400).

Advisory Action dated Feb. 2, 2009, U.S. Appl. No. 11/491,435, IDF 3414 (4000-33400).

Office Action dated Apr. 24, 2009, U.S. Appl. No. 11/491,435, IDF 3414 (4000-33400).

Notice of Allowance dated Jun. 29, 2010, U.S. Appl. No. 11/491,435, IDF 3414 (4000-33400).

Office Action dated Sep. 3, 2010, U.S. Appl. No. 11/833,555, IDF 4836 (4000-61600).

Barkley Sr., Bruce T., "Integrated Project Management," McGraw-Hill Companies, Inc., USA.

Mentz, G., et al., "Project Management Guide, " Nov. 18, 2005, International Project Management Commission; American Academy of Project Management.

Final Office Action dated Dec. 28, 2010, U.S. Appl. No. 11/833,555, IDF 4836 (4000-61600).

Advisory Action dated Mar. 3, 2011, U.S. Appl. No. 11/833,555, IDF 4836 (4000-61600).

Notice of Allowance dated Apr. 22, 2011, U.S. Appl. No. 11/833,555.

* cited by examiner

FIG. 3

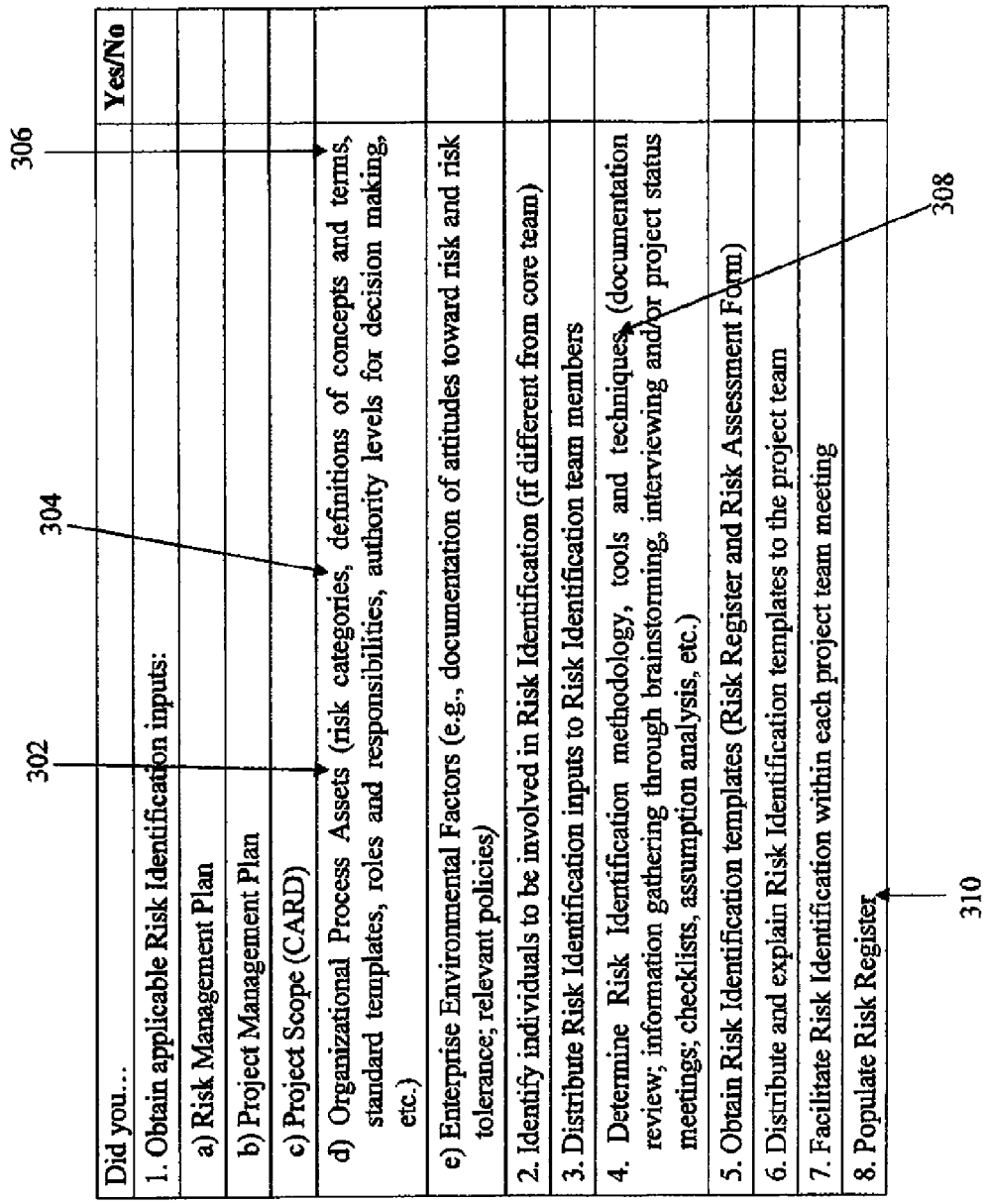

| Did you... | Yes/No |
|---|---|
| 1. Obtain applicable Risk Identification inputs: | |
| a) Risk Management Plan | |
| b) Project Management Plan | |
| c) Project Scope (CARD) | |
| d) Organizational Process Assets (risk categories, definitions of concepts and terms, standard templates, roles and responsibilities, authority levels for decision making, etc.) | |
| e) Enterprise Environmental Factors (e.g., documentation of attitudes toward risk and risk tolerance; relevant policies) | |
| 2. Identify individuals to be involved in Risk Identification (if different from core team) | |
| 3. Distribute Risk Identification inputs to Risk Identification team members | |
| 4. Determine Risk Identification methodology, tools and techniques (documentation review; information gathering through brainstorming, interviewing and/or project status meetings; checklists, assumption analysis, etc.) | |
| 5. Obtain Risk Identification templates (Risk Register and Risk Assessment Form) | |
| 6. Distribute and explain Risk Identification templates to the project team | |
| 7. Facilitate Risk Identification within each project team meeting | |
| 8. Populate Risk Register | |

112

| Risk ID 402 | Status 404 | Phase Identified 406 | Risk Description / Symptom 408 | Risk Type 410 | Root Cause 412 | Date Identified 414 | Identified by 416 |
|---|---|---|---|---|---|---|---|
| 1 | Draft | Concept | | Advisory | | | |
| 2 | Open | Analysis | | Escalatory | | | |
| 3 | Closed | Design | | | | | |
| 4 | | Development | | | | | |

| Project Impact 418 | Impact Description 420 | Impact Severity 422 | Probability 424 | Exposure 430 | Risk Response Strategy 426 | Risk Response Plan 114 | Owned by 428 | Specific Actions Taken 432 |
|---|---|---|---|---|---|---|---|---|
| Scope | | 1 | 10% | 0.10 | Avoid | | | |
| Quality | | 2 | 25% | 0.50 | Transfer | | | |
| Schedule | | 3 | 50% | 1.50 | Mitigate | | | |
| Cost | | 4 | 75% | 3.00 | Accept | | | |

| Percentage 512 | Estimation of Probability 510 |
|---|---|
| 10% | The risk has a very low probability of occurring |
| 25% | The risk has a low probability of occurring (one in four chances) |
| 50% | The risk has an equal probability of occurring (one in two chances) |
| 75% | The risk has a high probability of occurring (three in four chances) |
| 90% | The risk has a very high probability of occurring |

| Severity of Impact 504 | Very Low 514 1 | Low 516 2 | Moderate 518 3 | High 520 4 | Very High 522 5 |
|---|---|---|---|---|---|
| Cost 524 | Insignificant Cost Increase | Less than 5% Cost Increase | 5-10% Cost Increase | 10-20% Cost Increase | Greater than 20% Cost Increase |
| Schedule 526 | Schedule Slippage is Insignificant | Schedule Slippage is less than 5% | Schedule Slippage is 5-10% | Schedule Slippage is 10-20% | Schedule Slippage is Greater than 20% |
| Scope 528 | Scope Increase or Reduction is Insignificant | Scope Increase or Reduction is Low | Scope Increase or Reduction is Moderate | Scope Increase or Reduction is High | Scope Increase or Reduction is Very High |
| Quality 530 | Quality Reduction is Insignificant | Quality Reduction is Low | Quality Reduction is Moderate | Quality Reduction is High | Quality Reduction is Very High |

| | | | | | |
|---|---|---|---|---|---|
| Impact 5 | Green .50 | Yellow 1.25 | Yellow 2.50 | Red 3.75 | Red 4.50 |
| Impact 4 | Green .40 | Yellow 1.00 | Yellow 2.00 | Red 3.00 | Red 3.60 |
| Impact 3 | Green .30 | Green .75 | Yellow 1.50 | Yellow 2.25 | Red 2.70 |
| Impact 2 | Green .20 | Green .50 | Yellow 1.00 | Yellow 1.50 | Yellow 1.80 |
| Impact 1 | Green .10 | Green .25 | Green .50 | Green .75 | Green .90 |
| Exposure 506 | 10% Probability | 25% Probability | 50% Probability | 75% Probability | 90% Probability |

| Risk Rating: 508 | ▪ Green | ▪ Yellow | ▪ Red |
|---|---|---|---|
| The response should include: | ▪ Response Plan (optional) | ▪ Response Plan<br>▪ Contingency Plan | ▪ Response Plan<br>▪ Contingency Plan<br>▪ Contingency Schedule |

| | |
|---|---|
| Risk Owner 602: ____ Phone Number: ____ | |
| Escalated to: ____ Phone Number: ____ | |
| Response Dates 604: Response Due Date: ____ Date Response Provided: ____ | |
| Advisory to: ____ Phone Number: ____ | |
| Organization Name: ____ | |
| Management Level: ☐ Vice President ☐ Director ☐ Manager | |

| Project Information | |
|---|---|
| Identify Project: Project Title 606: ____ | Project SR #: ____ |
| Project Description: ____ | |

Risk Information

Risk Exposure to Project 608: ☐ Red ☐ Yellow ☐ Green

Project Impact 418: ☐ Cost ☐ Schedule ☐ Scope

Risk Identified in Phase 612: ☐ Concept ☐ Analysis ☐ Design ☐ Development ☐ Test ☐ Launch Risk Number 614 & Dates: Risk #: ____ Date Opened. ____ Date Updated: ____ Date Closed: ____

Risk Description 408: ____

Impact Description 420: ____

Project Contacts

| | |
|---|---|
| Project Manager: ____ | Phone Number: ____ |
| Requested by: ____ | Phone Number: ____ |
| Requested by Director: ____ | Phone Number: ____ |

Risk Response Plan 114

For escalations, if the risk is not resolved, or an action plan for resolution is not received by the "Response Due Date" shown above, this risk assessment will be escalated to the next level of management.

| Risk Response Plan Tasks 616 | Assigned to 618 | Director/Owner 620 | Date Due & Status 622 |
|---|---|---|---|
| 1. | | | |
| 2. | | | |
| 3. | | | |
| 4. | | | |
| 5. | | | |
| 6. | | | |
| 7. | | | |
| 8. | | | |
| 9. | | | |
| 10. | | | |

| To 704: | Project sponsor and Project team |
| --- | --- |
| Cc 706: | Project team Manager and Project team Director |
| From 708: | Risk Management Tool |
| Subject 710: | Risk Assessment – Project Name - SR####-1, Yellow, Advisory, Initial |
| Message 712: | As the sponsor of SR####, (title of the project), you are being advised that the project is in a (color) Risk Assessment situation. (Briefly describe, preferably in one sentence, the issue.) At this time, no action is required by you. The Risk Assessment is included for your information. |

FIG. 7

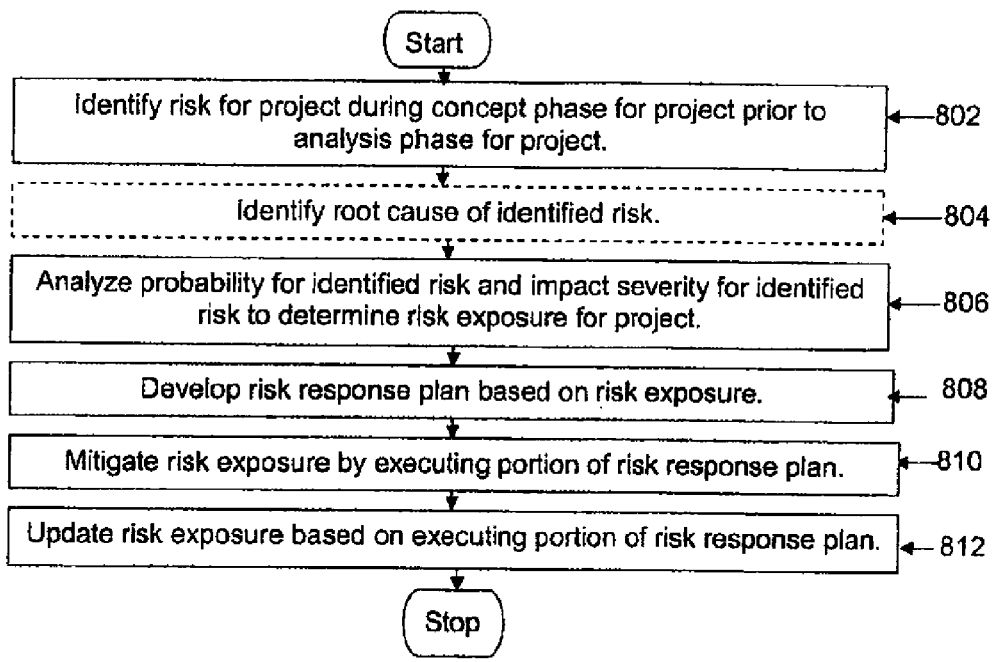

FIG. 8

METHOD FOR IDENTIFYING RISKS FOR DEPENDENT PROJECTS BASED ON AN ENHANCED TELECOM OPERATIONS MAP

CROSS-REFERENCE TO RELATED APPLICATIONS

This application includes subject matter related to U.S. patent application Ser. No. 11/833,555, filed Aug. 3, 2007, entitled "System and Method for Project Management Plan Workbook," by Noel R. Marchbanks which is hereby incorporated by reference for all purposes. This application includes subject matter related to U.S. patent application Ser. No. 11/491,435, filed Jul. 21, 2006, entitled "Etom Enhancement of Functional Requirements Modeling," by Thomas S. Dickson et al., which is hereby incorporated by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Project managers are responsible for successfully completing projects and achieving project objectives notwithstanding many risks which may threaten to disrupt project execution. A risk may be anything which is not currently confirmed but has the potential to negatively affect a project schedule, cost, functional scope, and/or quality. An issue is distinguished from a risk in that it is an existing problem whereas a risk is a future, uncertain event. Evaluating and coping with risks is difficult, particularly when project managers quantify risks differently and associate different levels of concern with the same quantified risk. Often risks are not addressed until the steps to mitigate the risks require greater resource allocation. Insufficiently mitigated risks can develop into problems that negatively impact other projects. Furthermore, risks change over time, such that a project manager may continue to invest significant resources mitigating a risk even after the risk has diminished in criticality. The project manager's director may be unaware of the changing risks for the project and the project manager's inefficient use of resources.

SUMMARY

Disclosed herein are systems and methods for risk management in project management. In some method embodiments, a risk is identified for a project during a concept phase for the project prior to an analysis phase for the project. A probability for an identified risk and an impact severity for the identified risk are analyzed to determine a risk exposure for the project. A risk response plan is developed based on the risk exposure. The risk exposure is mitigated by executing a portion of the risk response plan.

Some system embodiments include a risk management tool and a risk register. The risk management tool identifies a risk for a project during a concept phase for the project prior to an analysis phase for the project. The risk register analyzes a probability for an identified risk and an impact severity for the identified risk to determine a risk exposure for the project, and develops a risk response plan based on the risk exposure. The risk management tool also promotes mitigating the risk exposure by executing a portion of the risk response plan.

In other method embodiments, an operations map is defined by identifying functional areas and subareas of an enterprise. Applications of the enterprise are mapped onto the operations map. Requirements of a first project are mapped onto the operations map. A dependency of the first project on a second project is identified based on the operations map during a concept phase for the project prior to an analysis phase for the first project. A status of the second project is determined. The dependency is mitigated by delaying the first project and/or accelerating the second project, based on the status of the second project.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 shows a block diagram of a risk identification checklist according to some embodiments of the present disclosure.

FIG. 4 shows a block diagram of a risk register according to some embodiments of the present disclosure.

FIG. 5 shows a block diagram of risk register tools according to some embodiments of the present disclosure.

FIG. 6 shows a block diagram of a risk assessment form according to some embodiments of the present disclosure.

FIG. 7 shows a block diagram of a risk assessment e-mail according to some embodiments of the present disclosure.

FIG. 8 shows a flowchart of a method for risk management in project management according to some embodiments of the present disclosure.

DETAILED DESCRIPTION

Figure 1:
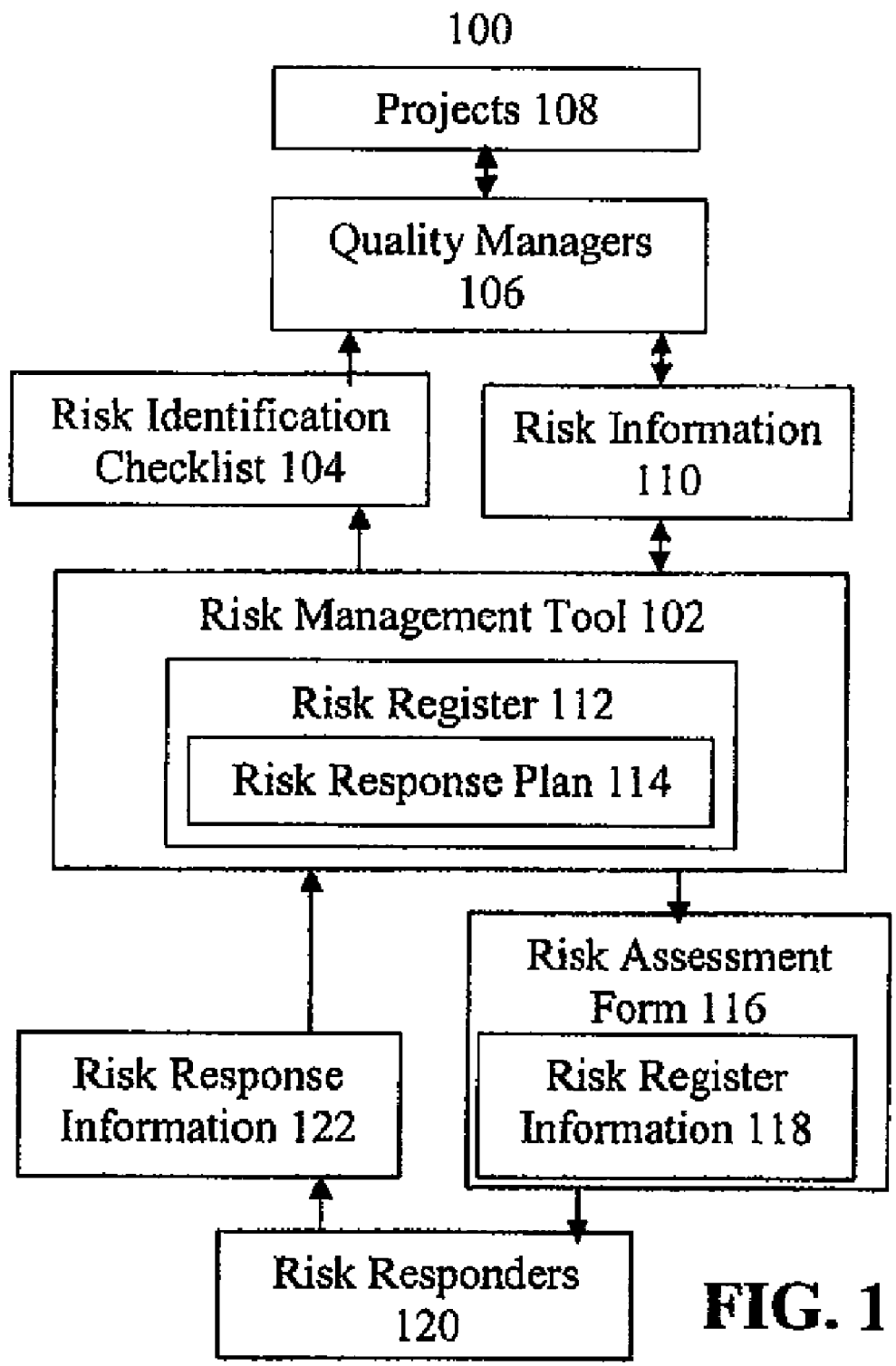
FIG. 1 shows a block diagram of a risk management system for project management according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In embodiments of the present disclosure, systems and methods are provided for risk management in project management. A risk management tool is disclosed that initially identifies risks during the concept phase, in contrast to the standard practice of identifying risks during the analysis phase or later. Project managers tend to identify risks during the analysis phase because of the perception that risks cannot be as accurately identified or analyzed during the earlier concept phase when the project is less defined. However, identifying risks during the concept phase enables project managers to begin taking actions to mitigate the risks at an earlier phase when the actions may require significantly less resources. Furthermore, the risk management tool identifies risks during each phase of project management. By identifying risks during each phase, the risk management tool enables the execution of proportional mitigation actions, such as allocating more resources to mitigate a risk with an escalating probability and allocating fewer resources to mitigate a risk with reducing severity of impact. Moreover, by identifying risks during each phase, the risk management tool enables identification of risks that did not exist during earlier phases of project management. In an embodiment, the risk management tool leverages an enhanced telecommunications operation map (eTOM) to identify and delimit dependencies among projects, resource commitments, and budget constraints, promoting enhanced visibility into risks at early project phases.

Instead of each project manager identifying and analyzing risks for their own projects according to their own subjective criteria, quality managers can use a probability table to qualitatively analyze various levels of probability for an identified risk and an impact table to qualitatively analyze various levels of impact severity for the identified risk. Together the probability and the impact severity for the identified risk determine a risk exposure for the project. Corresponding levels of risk exposure determine the type of risk response plan that may be developed by the quality managers. Executing the risk response plan can mitigate the risk exposure. Because execution of the risk response plan may result in changing either the probability or the impact for the identified risk, the risk exposure may be updated periodically to determine if the risk response plan needs to be changed at any point during the lifecycle of the project. In other embodiments, a dependency of a project on another project is identified during a concept phase for the project. Upon determining the other project's status, the dependency is mitigated by delaying the project and/or accelerating the other project, based on the other project's status.

Turning now to FIG. 1, a block diagram of a risk management system 100 for project management is shown according to some embodiments of the present disclosure. The numbers and types of each component in FIG. 1 are depicted for the purpose of an illustrative example only, as the system 100 can include any number and type of components. The system 100 includes a risk management tool 102, a risk identification checklist 104, quality managers 106, projects 108, and risk information 110. Although some embodiments describe the risk management tool 102 as electronically taking certain actions or processing certain data, in other embodiments these actions or activities may be accomplished manually, such as by a user completing a paper checklist. In other embodiments, these actions may be accomplished partially by hand and partially by the computer.

The risk management tool 102 provides the risk identification checklist 104 to the quality managers 106 to identify risks for the projects 108. The quality managers 106 submit the risk information 110, based on risks identified for the projects 108, to the risk management tool 102 to analyze the identified risks. The quality managers 106 may be a group of individuals responsible for identifying and analyzing risks for the projects 108. The quality managers 106 may include project managers responsible for identifying and analyzing risks for the projects 108 during project phases occurring after the concept phase. The risk management tool 102 inputs the risk information 110 to a risk register 112 to analyze identified risks, and may output risk information 110 from the risk register 112 to request additional risk information 110 from the quality managers 106. The quality managers 106 may use the risk information 110 from the risk register 112 to develop a risk response plan 114.

Based on the risk response plan 114, which may be stored in the risk register 112, the risk management tool 102 may execute a portion of the risk response plan 114 by providing a risk assessment form 116, which may include risk register information 118, to risk responders 120. The risk responders 120 may include individuals and groups of individuals responsible for responding to identified risks. The risk responders 120 may also include individuals and groups of individuals responsible for monitoring responses to risks, such as a project manager for a project, other project managers impacted by the project, directors who supervise the project managers, and vice presidents who supervise the directors. The risk responders 120 may respond to the risk assessment form 116 by providing risk response information 122 to the risk management tool 102. The risk management tool 102 may analyze the risk response information 122 to update the analysis of the identified risks.

Figure 2A:
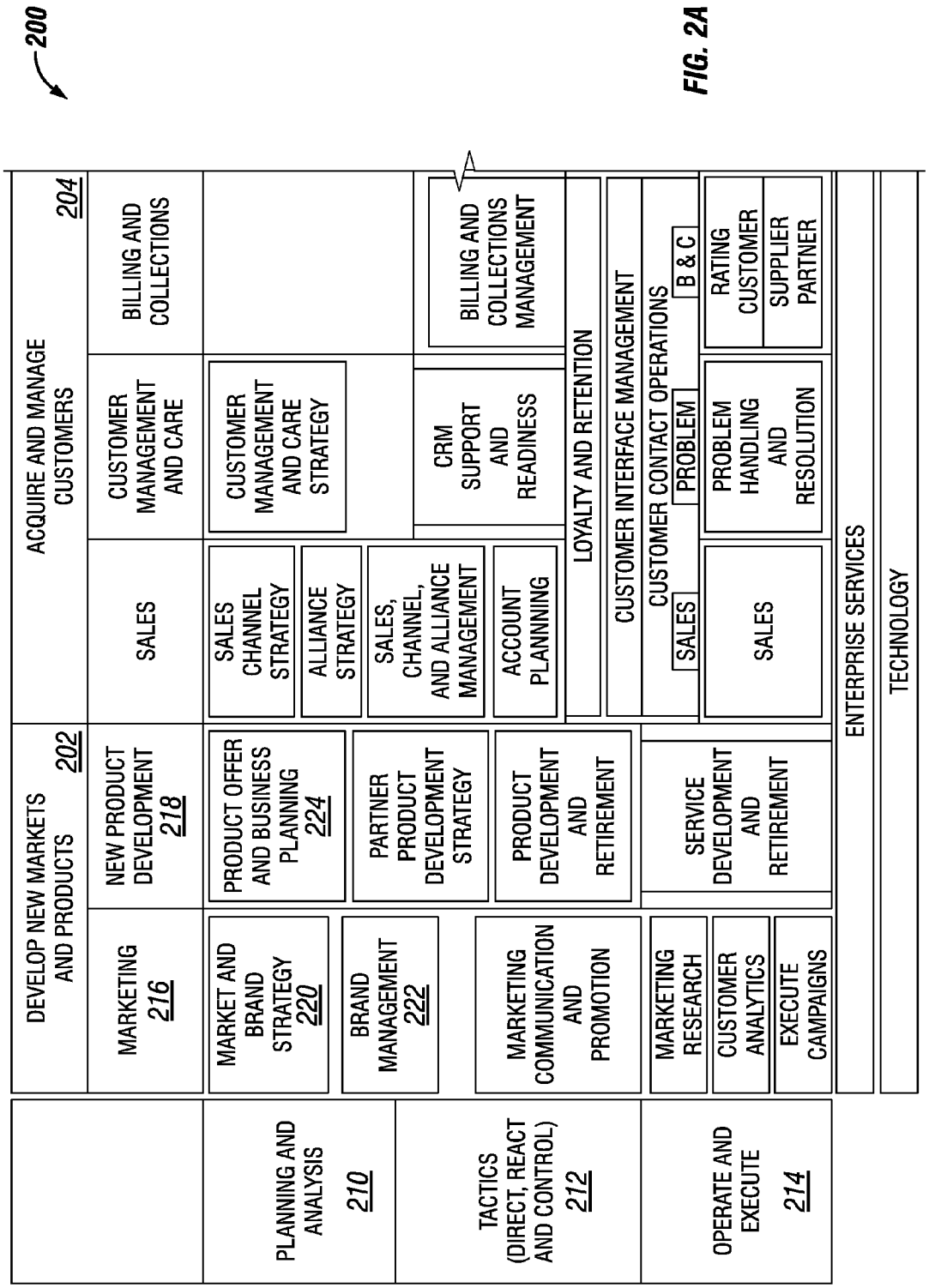
FIGS. 2A and 2B show a block diagram of an illustrative telecommunications entity, organized by functional domains.
Figure 2B:
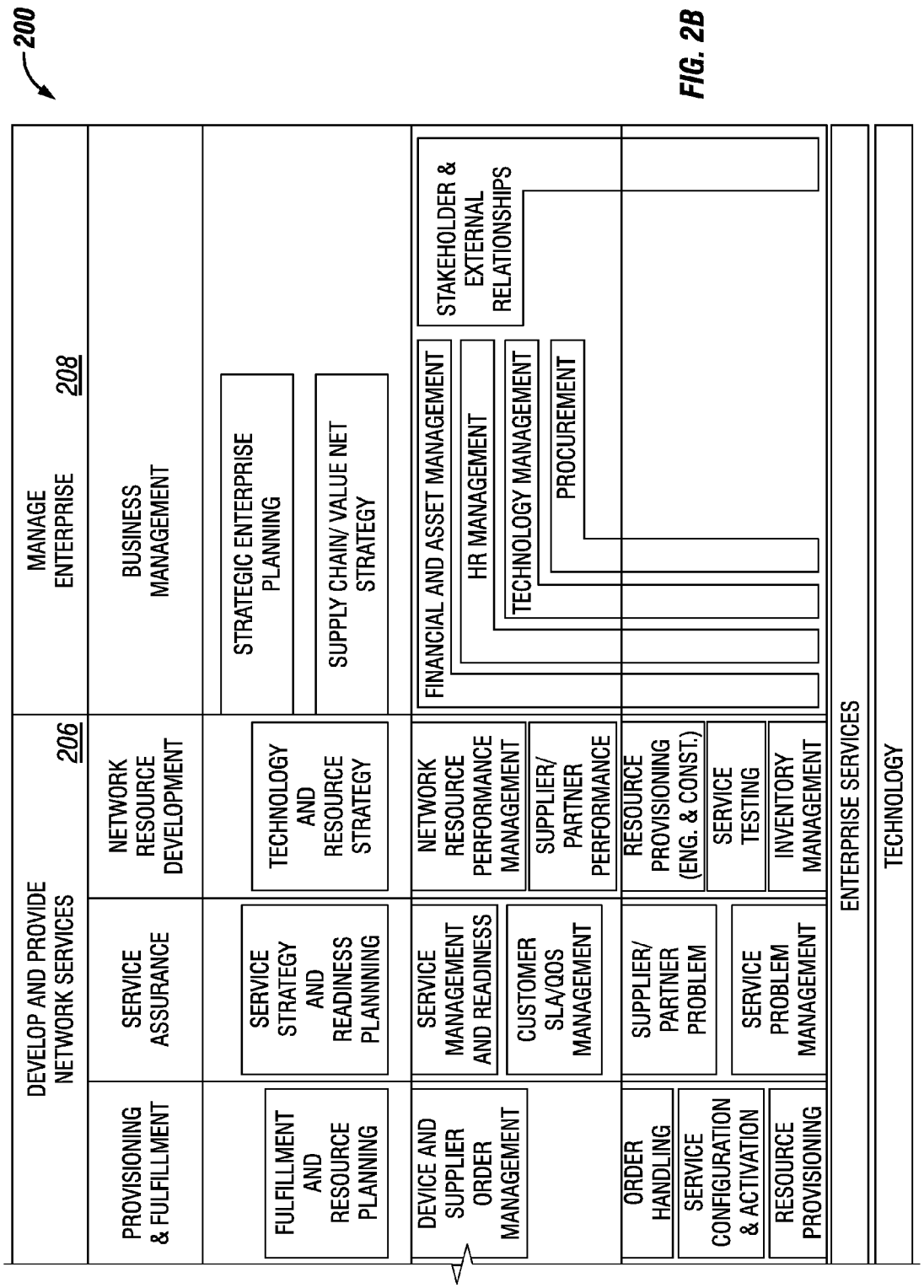

Turning now to FIGS. 2A and 2B, a block diagram 200 is shown of a telecommunications entity, organized by functional domains. A project may develop applications for implementing objectives of the project, and each functional domain is a group of related applications. The functional domains in FIGS. 2A and 2B may be a standardized map for operations of a telecommunications business. Embodiments of the present disclosure can use the standardized map as a framework for organizing applications that are part of a project. The functional domains in the block diagram 200 may be different for another type of business entity, and in another embodiment other functional domains other may be defined for the business entity.

The terminology for each functional domain in the block diagram 200 may be loosely based on enhanced Telecom Operations Map (e-TOM) standards to offer some terminology familiarity to method and system users. One standard approach to grouping related applications into functional domains is based on the Project Management Institute's *A Guide to the Project Management Body of Knowledge (PM-BOK® Guide)*. Newtown Square, Pa.: Project Management Institute, Inc., c2004, 3$^{rd}$ Edition. HD69.P75 G845 2004, which is incorporated herein by reference for all purposes. This approach addresses mapping a project to a set of functional domains, which may be included in project management processes.

Applications may be grouped in functional domains based on the business category of the applications and the functions of the applications. In the present example, the business categories for functional domains include: "develop new markets and products" 202, "acquire and manage customers" 204, "develop and provide network services" 206, and "manage enterprise" 208. The business categories may be divided into general functions that include: "planning and analysis" 210, "tactics (direct, redirect, and control)" 212, and "operate and execute" 214. The business categories for functional domains may be further divided into sub-categories, such as a "marketing" 216 sub-category and a "new product development" 218 sub-category, which are sub-categories for the "develop new markets and products" 202 business category.

A "market and brand strategy" 220 functional domain may include applications associated with market strategy and applications associated with brand strategy. The "market and brand strategy" 220 functional domain may be associated with the "planning and analysis" 210 functions and associated with the "marketing" 216 sub-category, associations which determine the location of the "market and brand strategy" 220 functional domain in the block diagram 200. In addition to being associated with the "marketing" 216 sub-category, a "brand management" 222 functional domain may include applications associated with both the "planning and analysis" 210 functions and the "tactics" 212 functions. This combination of associations determines the location of the "brand management" 222 functional domain in the block diagram 200. In another example, a "product offer and business planning" 224 functional domain may be associated with the "planning and analysis" 210 functions and the "new product development" 218 sub-category, associations which determine the location of the "product offer and business planning" 224 functional domain in the block diagram 200.

Embodiments of the present disclosure may use an e-TOM tool for mapping a project to a map of a telecommunications entity, such as the block diagram 200, to determine potentially impacted applications in the set of functional domains, which may determine project dependencies. For example, a telecommunications entity evaluates a brand development project by using an e-TOM tool to map the brand development project to the block diagram 200. The brand development project may be mapped to the "market and brand strategy" 220 functional domain, which is associated with the "planning and analysis" 210 functions and the "marketing" 216 sub-category. The brand development project may also be mapped to the "brand management" 222 functional domain, which is associated with both the "planning and analysis" 210 functions and the "tactics" 212 functions. These mapping results identify the functional domains potentially impacted by the brand development project, and the management teams potentially responsible for implementing the "planning and analysis" 210 functions and the "tactics" 212 functions for the brand development project.

Further to this example, applying a Work Breakdown Structure (WBS) to the brand development project may identify an application required for allocating brand resources. A WBS is a fundamental project management technique for defining and organizing the total scope of a project using a hierarchical tree structure. The mapping results may indicate that the brand resource allocation application is to interact with a brand objectives application within the "brand management" 222 functional domain. Because another project in progress is revising the brand objectives application, the brand resource allocation application is dependent upon the completion of the other project in progress to be able to properly interact with the revised brand objectives application. Therefore, the brand development project is dependent upon the completion of the other project in progress, such that delays to the other project result in delays to the brand development project.

Additionally, the directors of the management teams responsible for the "planning and analysis" 210 functions and the "tactics" 212 functions under the "marketing" 216 sub-category may use the mapping of the brand development project to the "market and brand strategy" 220 functional domain and the "brand management" 222 functional domain. The directors may use the mapping to determine the budget and to allocate resources for the brand development project. The directors may also use the mapping to identify a particular project manager who has specific resources available to manage the project based on similar projects completed by the project manager. Additionally, the directors may use the mapping to assign the brand management project to the project manager, to reserve a portion of the project manager's budget for the project, and to schedule the project on the project manager's schedule.

FIG. 3 shows a block diagram of the risk identification checklist 104 according to some embodiments of the present disclosure. The block diagrams of FIG. 3 through FIG. 7 are directed to a preferred embodiment, but in other embodiments other checklists, processes, and tools may be used that have similar or different components, all of which are within the spirit and scope of the present disclosure. The risk management tool 102 provides the risk identification checklist 104 to the quality managers 106 to identify risks for the projects 108 by listing actions to take to identify the risks. For example, the quality managers 106 may reference "organizational process assets" 302 to review "risk categories" 304, which may include risks to a projects' costs, risks to a project's schedule, risks to a project's scope, and risks to a project's quality. In another example, the quality managers 106 may reference the "organizational process assets" 302 to use "definitions of concepts and terms" 306 to identify risks. For example, the "definitions of concepts and terms" 306 may differentiate between an issue for a project, which is a true condition that currently impacts a project, and a risk for a project, which is a condition that might impact a project in the future if the risk becomes true.

The quality managers 106 may also reference "Determine Risk Identification methodology, tools and techniques" 308 to identify risks through various means, such as documentation review; information gathering through brainstorming, interviewing and/or project status meetings; checklists, and assumption analysis. The risk identification checklist 104 instructs the quality managers 106 to "populate risk register" 310 after systematically identifying risks for a project. For example, the quality managers 106 submit the risk information 110 to populate the risk register 112 based on the identified risks.

FIG. 4 shows a block diagram of the risk register 112 according to some embodiments of the present disclosure. The risk register 112 inputs the risk information 110 from the quality managers 106 to analyze the risks for a project. The risk register 112 includes columns for inputting data, such as columns for a risk ID 402, a status 404, a phase identified 406, a risk description/symptom 408, a risk type 410, a root cause 412, a date identified 414, identified by 416, a project impact 418, an impact description 420, an impact severity 422, a probability 424, a risk response strategy 426, a risk response plan 114, and an owned by 428. The risk register 112 also bases an exposure 430 on the impact severity 422 and the probability 424 input by the quality managers 106. Additionally, the risk register 112 includes a specific actions taken 432 column that includes the risk response information 122 from the risk responders 120. Furthermore, the risk responders 120 may update the impact severity 422 column and the probability 424 column for a risk, which may result in an updated value in the exposure 430 column. The columns 402 to 432 shown for the risk register 112 are an example of one embodiment of the risk register 112. In another embodiment, the risk register 112 can include any number and type of columns. The cells in each row of the risk register 112 are associated with the other cells in the same row.

The risk ID 402 column lists a unique identifier for each risk identified for a single project, such as 1 for a risk that impacts a project's scope and 2 for another risk that impacts the same project's quality. The status 404 column lists the current status for each risk, such as draft, open, or closed. A risk may have a draft status when one of the quality managers 106 tentatively identifies the risk for a project without consultation or confirmation by the other quality managers 106. A risk may have the status of open when all of the quality managers 106 assigned to analyze the project agree that the project has the risk. A risk may have the status of closed when execution of a risk response plan reduces the probability of the risk to 0% or reduces the impact of the risk to negligible.

The phase identified 406 column indicates the project management phase during which the risk is identified, such as the concept phase, the analysis phase, the design phase, the development phase, the test phase, or the launch phase. The risk management tool 102 initially identifies risks during the concept phase, in contrast to the standard practice of identifying risks during the analysis phase or later. Project managers tend to identify risks during the analysis phase because of the perception that risks cannot be as accurately identified or analyzed during the earlier concept phase when the project is less defined. However, identifying risks during the concept phase enables project managers to begin taking actions to mitigate the risks at an earlier phase when the actions may require significantly less resources. Furthermore, the risk management tool 102 identifies risks during each phase of project management. By identifying risks during each phase, the risk management tool 102 enables the execution of proportional mitigation actions, such as allocating more resources to mitigate a risk with an escalating probability and allocating fewer resources to mitigate a risk with reducing severity of impact. Moreover, by identifying risks during each phase, the risk management tool 102 enables identification of risks that did not exist during earlier phases of project management. In an embodiment, the risk management tool 102 leverages an existing enhanced telecommunications operation model (eTOM) to identify and delimit dependencies among projects, resource commitments, and budget constraints, promoting enhanced visibility into risks at early project phases.

The risk description/symptom 408 column lists a description of the risk that enables the quality managers 106 and the risk responders 120, which may include project managers, to understand the identified risk. For example, the risk description/symptom 408 column may specify that the project is dependent on the completion of another project. Continuing this example, a brand resource allocation application that interacts with a brand objectives application is dependent upon the completion of another project responsible for revising the brand objectives application, such that delays to the other project results in delays to the brand development project.

The risk type 410 column specifies the type of risk for the project, such an advisory risk or an escalatory risk. The risk management tool 102 may send an advisory risk notice to a project manager to advise the project manager about the risk. In contrast, the risk management tool 102 may send an escalatory risk notice to the project manager and other members of the risk responders 120, such as the director who supervises the project manager, to warn about a risk of increasing probability or increasing severity. The root cause 412 column lists any root cause for the identified risk, such as another project revising an application upon which one of the project's applications depends. Identifying the root causes for all risks over time may enable an entity to identify a specific root cause that occurs for many risks and take action to reduce the probability and/or the impact of the risks created by the specific root cause.

The date identified 414 column lists the date that a risk was identified, whereas the identified by 416 column lists the individual or group that identified the risk. The project impact 418 column identifies the type of impact that the risk may have on the project, such as an impact on scope, quality, schedule, or cost. For example, a cost impact risk may result in a project exceeding its budget, and a schedule impact risk may result in a project completing after its launch deadline. A quality impact risk may result in an application not functioning as efficiently as originally planned, while a scope impact risk may result in an application not offering as many features as originally planned. The impact description 420 column lists a description of the impact that a risk may have on a project, such as delaying the development phase of a dependent project during the development phase of another project.

The impact severity 422 column lists one of many pre-specified levels of impact severity that the risk may have for the project. The levels may be 1 for very low, 2 for low, 3 for moderate, 4 for high, and 5 for very high. The risk management tool 102 may offer selection of pre-specified levels of impact severity to enable qualitative analysis of risks. For example, if project managers are requested to arbitrarily assign a numerical value from 1 to 5 that represents the impact severity that a risk has for a project, the project managers may assign risks having the same level of impact severity different numerical values due to the subjective nature of the assessment and the lack of a normative standard of assessment. Therefore, by associating descriptions of impact severity with numerical values, the risk management tool 102 can enable the quality managers 106 to agree upon the description of the impact severity for a risk, which results in assigning consistent numerical values to risks having similar impact severity.

The probability 424 column lists one of many pre-specified levels of probability that the risk may become true for the project. The levels may be 10% for very low probability, 25% for low probability, 50% for moderate probability, 75% for high probability, and 90% for very high probability. The risk management tool 102 may offer selection of pre-specified levels of probability to enable systematic analysis of risks. For example, if project managers are requested to arbitrarily assign a numerical value from 0% to 100% that represents the probability that a risk may become true for a project, the project managers may assign risks having similar probability of occurrence different numerical values due to the subjective nature of the assessment and the lack of a normative standard of assessment. For example, all project managers impacted by a project may analyze the same risk as having a high probability of becoming true, but one project manager may arbitrarily associate 65% with a high probability while another project manager arbitrarily associates 85% with a high probability. Therefore, by associating descriptions of probability with numerical values, the risk management tool 102 can enable the quality managers 106 to agree upon the description of the probability for a risk, which results in assigning consistent numerical values to risks having similar probability.

The risk response strategy 426 column lists the strategy selected for responding to the risk, such as an avoid strategy, a transfer strategy, a mitigate strategy, and an accept strategy. An avoid strategy may specify changing the project plan to eliminate the risk. A transfer strategy may specify shifting the consequences of the risk to a third party. A mitigate strategy may specify changing the project plan to reduce the probability or impact of the risk. An accept strategy may be either a passive acceptance strategy or an active acceptance strategy. An active acceptance strategy may specify creating a contingency plan. A passive acceptance strategy may specify not changing the project plan.

The risk response plan 114 column lists a specific response plan developed for an identified risk for a project. For example, if the development phase of a project depends upon another project completing its own development phase, the risk response plan 114 for the dependency risk may require monitoring the status of the other project, and delaying the project and/or accelerating the other project based on the monitored status. The risk response plan 114 may also include a contingency plan and a contingency schedule. The owned by 428 column lists those responsible for implementing the risk response plan 114. The specific actions taken 432 column lists steps in the risk response plan 114 executed by the risk responders 120.

The exposure 430 column lists the risk exposure for a project based on the impact severity 422 for the project and the probability 424 for the project. For example, the risk with the risk ID 402 of 1 may have 3 for the impact severity 422 and 10% for the probability 424. In this example, the exposure 430 is the product of the impact severity 422 and the probability 424, or 0.30, which equals 3 multiplied by 10%. In another example, the risk with the risk ID 402 of 3 may have 2 for the impact severity 422 and 75% for the probability 424. For this other example, the exposure 430 is the product of the impact severity 422 and the probability 424, or 1.50, which equals 2 multiplied by 75%. The risks listed in the risk register 112 may be sorted by the value of the exposure 430, such that risks with high exposure 430 values are listed higher in the risk register 112 list while risks with low exposure 430 values are listed lower in the risk register 112 list. By sorting risks using the exposure 430, the risk register 112 brings the attention of the project manager and other risk responders 120 to the most critical risk first, with less critical risks listed in descending order of the exposure 430.

FIG. 5 shows a block diagram of risk register tools according to some embodiments of the present disclosure. The risk register tools include a probability 502 table, a severity of impact 504 table, an exposure 506 table, and a risk rating 508 table. The probability 502 table includes an estimation of probability 510 column, which offers descriptions of distinct levels for the probability of a risk becoming true. For example, the second row in the estimation of probability 510 column specifies "The risk has a low probability of occurring (one in four chances)." The second row of the estimation of probability 510 column may enable each of the quality managers 106 to analyze a risk as a low probability risk. Therefore, each of the quality managers 106 may agree to enter the corresponding percentage 512 of 25% into the probability column 424 for the risk in the risk register 112. The levels in the probability 502 table are typical of one embodiment, and for other embodiments the probability 502 table may include other levels.

The severity of impact 504 table lists columns for each distinct level of a risk's impact severity, including columns for a very low 514 level of impact severity, a low 516 level of impact severity, a moderate 518 level of impact severity, a high 520 level of impact severity, and a very high 522 level of impact severity. The severity of impact 504 table also includes rows for each of the project impact 418 types, such as cost 524, schedule 526, scope 528, and quality 530. The quality managers 106 may use the severity of impact 504 table to qualitatively assign the impact severity 422 in the risk register 112 for a risk to a project. For example, the low 516 column for the schedule 526 row lists "schedule slippage is less than 5%." By using the severity of impact 504 table, each of the quality managers 106 may qualitatively assign a low 516 level of impact severity for a risk to a project's schedule that may cause the schedule to slip by less than 5%. Because the low 516 column in the severity of impact 504 table corresponds to the value of 2, the quality managers 106 may enter the value of 2 for the impact severity 422 of the risk in the risk register 112. The levels in the severity of impact 504 table are typical of one embodiment, but in other embodiments the severity of impact 504 table may include other levels.

The exposure 506 table includes columns for probabilities and rows for impacts to indicate the possible combinations of the impact severity 422 and the probability 424. For example, a column for 25% probability and a row for an impact of 2 indicate an exposure of 0.50. The exposure 506 table indicates that this risk exposure of 0.50 corresponds to a green level of risk exposure. Values for risk exposure may be categorized into discrete levels of risk exposures, such as informative, cautionary, and urgent levels, and these levels may be displayed as various colors that call appropriate attention to the risk exposure. For example, the exposure 506 table indicates that exposure values from 0.10 to 0.90 correspond to the informative or green level, exposure values from 1.00 to 2.50 correspond to the cautionary or yellow level, and exposure values of 2.70 to 4.50 correspond to the urgent or red level. The levels in the exposure 506 table are typical of one embodiment, but in other embodiments the exposure 506 table may include other levels. The risk register 112 may indicate different actions to take based on whether a green level, a yellow level, or a red level is produced by the impact severity 422 and the probability 424.

The risk rating 508 table may specify the responses to execute based on the level of risk exposure. For example, the risk rating table 508 recommends the optional development of a response plan for risks that produce a green level of exposure. In contrast, the risk rating table 508 recommends the development of a response plan, a contingency plan, and a contingency schedule for risks that produce a red level of exposure. By using the risk register tools depicted in FIG. 5, the quality managers 106 may qualitatively analyze the probability 424 of a risk and the impact severity 422 of the risk, produce the exposure 430 of the risk, and develop the risk response plan 114 accordingly.

FIG. 6 shows a block diagram of the risk assessment form 116 according to some embodiments of the present disclosure. The risk management tool 102 may send the risk assessment form 116 to the risk responders 120 to mitigate the risk exposure 430. The risk assessment form 116 may include fields for a risk owner 602, response dates 604, a project title 606, a risk exposure to project 608, the project impact 418, a risk identified in phase 612, a risk number 614, the risk description 408, the impact description 420, the risk response plan 114, risk response plan tasks 616, assigned to 618, director/owner 620, and date due & status 622.

The risk owner 602 field specifies the person or group responsible for mitigating a risk, and may be supplemented by contact information. The response dates 604 field may include dates when a response to the risk is scheduled and when the response to the risk is actually executed. The project title 606 field identifies the project for the risk. The risk exposure to project 608 field may indicate the level of risk exposure for the risk, such as red, yellow, or green. The project impact 418 field identifies the type of the risk, as indicated in the risk register 112. The risk identified in phase 612 field indicates the project phase in which the risk was identified, such as the information from the phase identified 406 column in the risk register 112. The risk number 614 field uniquely identifies the specific risk for the project, such as the information from the risk ID 406 column in the risk register 112. The risk description 408 field specifies a description of the risk, as indicated in the risk register 112. The impact description 420 field specifies a description of the risk impact on the project, as indicated in the risk register 112.

The risk response plan 114 field specifies a description of the planned responses to the risk, as indicated in the risk register 112. The cells in each row of the columns listed under the risk response plan 114 are associated with the other cells in the same row. The risk response plan tasks 616 field identifies a specific task in the response plan 114 for execution, such as monitoring the completion of the development phase for another project upon which the current project depends. The assigned to 618 field identifies the individual or group responsible for executing the corresponding risk response plan tasks 616, such as an individual responsible for monitoring the completion of the development phase for the other project. The director/owner 620 field identifies the individual or group responsible for supervising the execution of the corresponding risk response plan tasks 616, such as a director who supervises the individual responsible for monitoring the completion of the development phase for the other project. The date due & status 622 field indicates when the corresponding risk response plan tasks 616 is scheduled and the current status of the corresponding risk response plan tasks 616.

FIG. 7 shows an risk assessment e-mail 702 according to some embodiments of the present disclosure. The risk management tool 102 may send the risk assessment e-mail 702 to the risk responders 120 to inform about a risk and/or to initiate actions to mitigate the risk. The management tool 102 may automatically send the risk assessment e-mail 702 to the risk responders 120 based on a changing risk exposure, or based on a schedule in the risk response plan 114. The risk assessment e-mail 702 may include a to 704 field, a cc 706 field, a from 708 field, a subject 710 field, and a message 712 field. The to 704 field indicates the individual or group informed of the risk or requested to take action on the risk, such as the individual assigned one of the risk response tasks 616, as indicated in the assigned to 618 field. The cc 706 field indicates any additional individuals or groups to receive the risk assessment e-mail 702, such as a supervisor responsible for monitoring the individual assigned to execute one of the risk response plan tasks 616. The from 708 field indicates the originator of the risk assessment e-mail 702, such as the risk management tool 102 for automatically generated e-mails. One of the risk responders 120 may send the risk assessment e-mail 702 in response to receipt of an automatically generated e-mail. The subject 710 field identifies the content of the risk assessment e-mail 702. The message 712 field displays the content of the risk assessment e-mail 702. In FIG. 7, the content of the risk assessment e-mail 702 is a template that the risk management tool 102 fills in based upon the project title 606, the risk exposure to project 608, and any additional information.

FIG. 8 shows a flowchart of a method for risk management in project management according to some embodiments of the present disclosure. The risk management tool 102 may execute the method to identify and analyze risks for a project, develop a risk response plan, and execute part of the risk response plan to mitigate the risks.

In box 802, a risk is identified for a project during a concept phase for the project prior to an analysis phase for the project. For example, the risk management tool 102 sends the risk identification checklist 104 to the quality managers 106 during a concept phase prior to an analysis phase for a brand development project. Using the risk identification checklist 104, the quality managers 106 identify a cost risk for the brand development project. The risk management tool 102 may identify the cost risk by mapping the brand development project to systems based on enhanced telecom operations map standards, such as the systems depicted in FIGS. 2A and 2B. The risk management tool 102 may identify the cost risk by utilizing a work breakdown structure that identifies a brand resource allocation application as part of the brand development project. The systems may include applications impacted by the brand development project, such as a brand objectives application with which the brand resource allocation application is required to interact. The risk management tool 102 may identify the cost risk by mapping the brand development project to a budget and/or a resource, such as a budget that can be allocated for developing the brand resource allocation application and a project manager assigned to develop the brand resource allocation application.

In box 804, a root cause of the identified risk is optionally identified. For example, the risk management tool 102 identifies a root cause of the cost risk as a potential interface problem between the brand objectives application and the brand resource allocation application. The cost risk for the project may be due to this potential interface problem because an unknown amount of additional funds may need to be allocated in the future to the budget for the brand management project.

In box 806, a probability for an identified risk and an impact severity for the identified risk are analyzed to determine a risk exposure for the project. For example, the risk register 112 analyzes the probability 424 for the cost risk and the impact severity 422 for the cost risk to determine the exposure 430 for the brand management project. Continuing this example, the quality managers 106 use the probability 502 table to analyze the probability 424 for the cost risk as a risk with a high probability of occurring, corresponding to the percentage 512 of 75%. Furthermore, the quality managers 106 use the severity of impact 504 table to analyze the impact severity 422 for the cost risk as a low 516 severity of impact, based on less than 5% cost increase, which corresponds to a severity of impact 504 table value of 2. The quality managers 106 include the probability 424 of 75% and the impact severity 422 of 2 as part of the risk information 110 submitted to the risk register 112. The risk register 112 determines the exposure 430 of 1.50 based on the probability 424 of 75% and the impact severity 422 of 2, as indicated by the exposure table 506. The exposure table 506 indicates that an exposure 430 of 1.50 corresponds to a yellow level of risk exposure.

In box 808, a risk response plan is developed based on the risk exposure. For example, the risk register 112 displays the risk rating 508 table to the quality managers 106 to assist in developing a risk response plan based on the yellow level of risk exposure. As indicated by the risk rating 508 table, the risk register 112 requires the quality managers 106 to develop both a response plan and a contingency plan based on a yellow level of risk exposure. The quality managers 106 may develop the risk response plan 114 by identifying specific response tasks and individuals responsible for each response task, as indicated in the risk response plan 114 depicted in FIG. 6. The risk response plan 114 may be based on a strategy of avoid, transfer, passive accept, active accept, minimize probability, or minimize impact severity, as discussed above in reference to the risk response strategy 426 column. The risk response plan 114 may include a contingency plan and/or a contingency schedule based on the risk exposure. For example, the risk rating table 508 indicates that the quality managers 106 has the option of responding to a green level of risk exposure by developing a risk response plan, whereas a response to a yellow level of risk exposure requires developing both a response plan and a contingency plan. Furthermore, a red level of risk exposure requires developing a response plan, a contingency plan, and a contingency schedule.

In box 810, the risk exposure is mitigated by executing a portion of the risk response plan. For example, the risk management tool 102 executes a portion of the risk response plan by providing the risk assessment form 116, including risk register information 118, to the risk responders 120. The risk responders 120 may include each of the individuals listed in the assigned to 618 column who are responsible for executing each of the risk response plan tasks 616. The risk responders 120 may also include those responsible for supervising the individuals who are assigned risk response plan tasks 616. The risk assessment form 116 may list only the risk response plan tasks 616 that the recipient is responsible for executing, or the risk assessment form 116 may list all of the risk response plan tasks 616 to enable the recipient to understand how the recipient's assigned tasks fit into the context of the risk response plan 114.

In box 812, the risk exposure is updated based on executing the portion of the risk response plan. For example, one of the risk responders 120 executes an assigned response task to mitigate an identified risk, and submits the risk response information 122 to the risk management tool 102. The risk management tool 102 uses the risk response information 122 to update the risk register 112. The risk register 112 may update either the impact severity 422 or the probability 424 for the risk based on the risk response information 122. Updating either the impact severity 422 or the probability 424 for the risk may result in updating the risk exposure 430. An updated risk exposure 430 may result in a different level of risk exposure for the risk, which may result in updating the risk response plan 114 for the risk.

Figure 9:
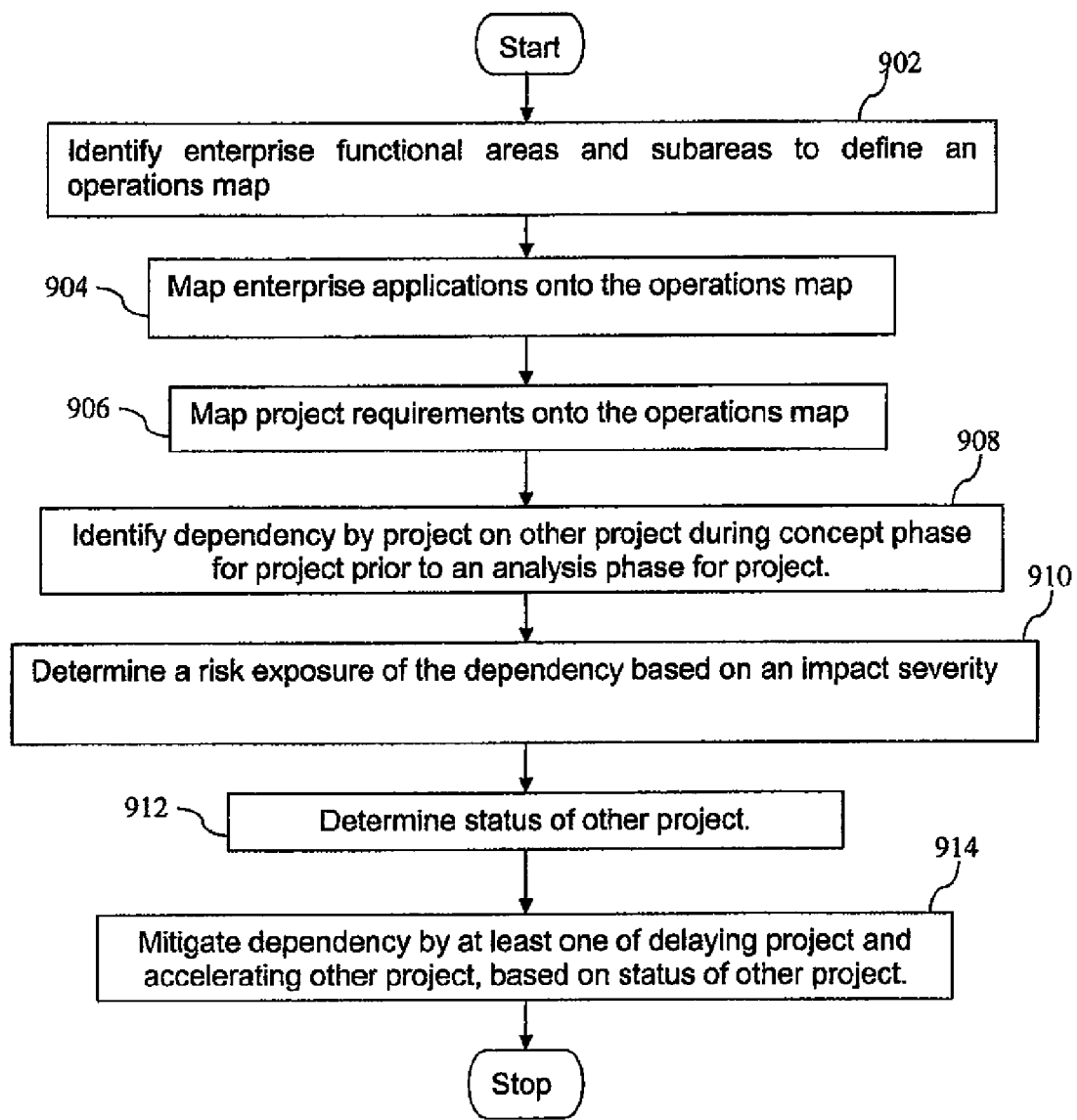
FIG. 9 shows a flowchart of another method for risk management in project management according to some embodiments of the present disclosure.

FIG. 9 shows a flowchart of another method for risk management in project management according to some embodiments of the present disclosure. The risk management tool 102 may execute the method to identify dependencies for a project, and mitigate the dependency by delaying the current project and/or accelerating another project upon which the current project depends.

In box 902, a plurality of functional areas and subareas are identified to define an operations map. In an embodiment, the operations map may be an eTOM. The operations map may include further stratification into layers, for example subareas decomposed into sub-subareas and sub-sub-subareas.

In box 904 a plurality of applications of an enterprise or business unit are mapped onto the operations map. In an embodiment, the operations map may be supported by a tool that maybe employed to link or associated applications with specific area, subareas, or categories of the operations map.

In box 906 project requirements of a project being managed by the risk management tool 102 are mapped onto the operations map. This project may be referred to as a first project.

In box 908 a dependency of the project on another project, which may be referred to as a second project, is identified for the project during a concept phase for the project prior to an analysis phase for the project. For example, during a concept phase and prior to an analysis phase for a brand development project, the risk management tool 102 identifies a dependency of a brand resource allocation application for the brand development project on a brand objectives application for another project. The risk management tool 102 may identify the dependency by mapping the brand development project to systems based on the eTOM, such as the systems depicted in FIGS. 2A and 2B. For example, a project manager working on a prospective project related to billing subscribers or customers may use the eTOM to identify other projects or applications related to billing subscribers or customers. The project manager may use the eTOM to identify currently in-progress billing projects upon which the prospective project depends and hence which may be sources of risks for the prospective project, for example if they complete late or are completed with changed scope. The project manager may use the eTOM to bound the sources of risk that are analyzed or considered, for example by determining to consider those associated with billing applications but disregarding customer service related risks.

In box 910, a risk exposure for the first project is determined based on the dependency on the second project. For example, the risk management tool 102 may use the risk register 112 to analyze a low (25%) probability 424 for the dependency and a moderate (3) impact severity 422 for the dependency to determine a green level of risk exposure (0.75) for the dependency of the brand development project on the other project.

In box 912, a status of the other project is determined. For example, the risk management tool 102 determines a status of the other project, wherein the status is based on a size for the other project, a complexity for the other project and/or a projected time to completion for the other project. For example, if the projected time for completion for the other project is two weeks behind the scheduled time for completion, the risk management tool 102 determines that the other project has a two weeks delayed status.

In box 914, the dependency is mitigated by delaying the project and/or accelerating the other project, based on the status of the other project. For example, the risk management tool 102 mitigates the dependency by providing the risk assessment form 116 to the risk responders 120, which includes the project managers for both the brand development project and the other project with the two week delay. Based on the two week delayed status of the other project, the project managers may respond to the risk assessment form 116 by delaying the brand development project for two weeks, accelerating the other project by two weeks, or delaying the brand management project by one week and accelerating the other project by one week. If the status for the other project indicate that the other project cannot be accelerated, the brand development project is delayed for two weeks.

Figure 10:
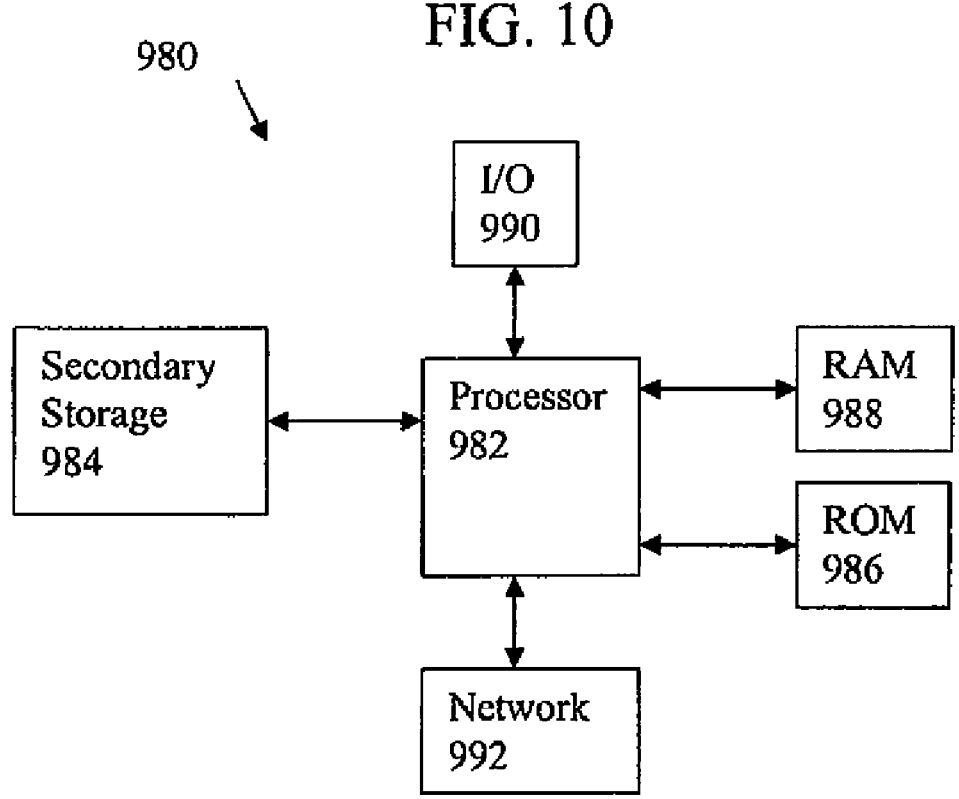
FIG. 10 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 10 illustrates a typical, general-purpose computer system suitable for implementing one or more embodiments disclosed herein. The computer system 980 includes a processor 982 (which may be referred to as a central processor unit or CPU) that is in communication with memory devices including secondary storage 984, read only memory (ROM) 986, random access memory (RAM) 988, input/output (I/O) 990 devices, and network connectivity devices 992. The processor may be implemented as one or more CPU chips.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage. The RAM 988 is used to store volatile data and perhaps to store instructions. Access to both ROM 986 and RAM 988 is typically faster than to secondary storage 984.

I/O devices 990 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 992 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 992 may enable the processor 982 to communicate with an Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave Such information, which may include data or instructions to be executed using processor 982 for example, may be received from and outputted to the network, for example, in the form of a computer data baseband signal or signal embodied in a carrier wave. The baseband signal or signal embodied in the carrier wave generated by the network connectivity devices 992 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 982 executes instructions, codes, computer programs, scripts which it accesses from hard disk, floppy disk, optical disk (these various disk based systems may all be considered secondary storage 984), ROM 986, RAM 988, or the network connectivity devices 992.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer implemented method for risk management in project management, comprising:

defining an enhanced telecom operations map by identifying a plurality of functional domains for an enterprise, each of the plurality of functional domains arranged in the enhanced telecom operations map based on a business category of a plurality of business categories and a function of a plurality of functions of the enterprise;

mapping a plurality of enterprise applications related to a plurality of projects into the plurality of functional domains on the enhanced telecom operations map based on a business category of the plurality of business categories and a function of the plurality of functions associated with each enterprise application of the plurality of enterprise applications;

mapping a plurality of requirements of a project into one or more functional domains of the plurality of functional domains on the enhanced telecom operations map;

identifying, by a risk management tool stored on a non-transitory computer readable medium and executable by a processor, risks for a project during each phase of the project by mapping the project to systems based on enhanced telecom operations map standards, a first risk identified during a concept phase for the project prior to an analysis phase for the project, a second risk that did not exist during earlier phases of the project identified during a phase subsequent to the concept phase, a third risk comprising a dependency of the project on a second project of the plurality of projects identified based on the enhanced telecom operations map, and the second project comprising at least one enterprise application of the plurality of enterprise applications in the one or more functional domains that include the plurality of requirements of the project;

analyzing, by a risk register, stored on a non-transitory computer readable medium and executable by a processor, for each of the identified risks, a probability and an impact severity to determine a risk exposure for the project, the analyzing including analyzing a probability for the dependency and an impact severity for the dependency to determine a risk exposure for the dependency;

developing, by the risk register, a risk response plan for at least one of the identified risks based on the risk exposure for the project associated with the at least one of the identified risks;

mitigating the risk exposure for the project associated with the at least one of the identified risks by executing a portion of the risk response plan;

determining a status of the second project; and mitigating the dependency by at least one of delaying the project and accelerating the second project based on the status of the second project.

2. The computer implemented method of claim 1 further comprising identifying a root cause of at least one of the identified risks.

3. The computer implemented method of claim 1 further comprising updating the risk exposure for at least one of the identified risks based on executing the portion of the risk response plan.

4. The computer implemented method of claim 1 wherein identifying the risks comprises providing a risk identification checklist.

5. The computer implemented method of claim 1 wherein identifying the risks comprises utilizing a work breakdown structure.

6. The computer implemented method of claim 1 wherein the systems comprise impacted applications.

7. The computer implemented method of claim 1 wherein identifying the risks comprises mapping the project to at least one of a budget and a resource.

8. The computer implemented method of claim 1 wherein the risk exposure for the project associated with the first identified risk is the product of the probability for the first identified risk and the impact severity for the first identified risk, and wherein the risk exposure for the project associated with the second identified risk is the product of the probability for the second identified risk and the impact severity for the second identified risk.

9. The computer implemented method of claim 1 wherein developing the risk response plan comprises identifying a response task and an individual responsible for the response task.

10. The computer implemented method of claim 1 wherein the response plan is based on a strategy of at least one of avoid, transfer, accept, minimize probability and minimize impact severity.

11. The computer implemented method of claim 1 wherein the response plan comprises at least one of a contingency plan and a contingency schedule based on the risk exposure of the at least one of the identified risks.

12. The computer implemented method of claim 1 wherein the probability comprises discrete levels of probability corresponding to a very low probability of occurring, a low probability of occurring, a moderate probability of occurring, a high probability of occurring, and a very high probability of occurring.

13. The computer implemented method of claim 1 wherein the impact severity comprises discrete levels of impact severity corresponding to a very low impact severity, a low impact severity, a moderate impact severity, a high impact severity, and a very high impact severity.

14. The computer implemented method of claim 1 wherein the risk exposure comprises discrete levels of risk exposure corresponding to informative, cautionary, and urgent.

15. A system for risk management in project management, comprising:
- a risk management tool to define an enhanced telecom operations map by identifying a plurality of functional domains for an enterprise, each of the plurality of functional domains arranged in the enhanced telecom operations map based on a business category of a plurality of business categories and a function of a plurality of functions of the enterprise;
- the risk management tool further to map a plurality of enterprise applications related to a plurality of projects into the plurality of functional domains on the operations enhanced telecom map based on a business category of the plurality of business categories and a function of the plurality of functions associated with each enterprise application of the plurality of enterprise applications;
- the risk management tool further to map a plurality of requirements of a project into one or more functional domains of the plurality of functional domains on the operations enhanced telecom map;
- the risk management tool further to identify risks for a project during each phase of the project by mapping the project to systems based on enhanced telecom operations map standards, a first risk identified during a concept phase for the project prior to an analysis phase for the project, a second risk that did not exist during earlier phases of the project identified during a phase subsequent to the concept phase, a third risk comprising a dependency risk of the project on a second project of the plurality of projects identified based on the enhanced telecom operations map, and the second project comprising at least one enterprise application of the plurality of enterprise applications in the one or more functional domains that include the plurality of requirements of the project;
- a risk register to analyze, for each of the identified risks, a probability and an impact severity to determine a risk exposure for the project, including the risk register to analyze a probability for the dependency and an impact severity for the dependency to determine a risk exposure for the dependency;
- the risk register further to develop a risk response plan for at least one of the identified risks based on the risk exposure for the project associated with the at least one of the identified risks;
- the risk management tool further to determine a status of the second project; and
- the risk management tool further to promote mitigating the risk exposure for the project associated with the at least one of the identified risks by executing a portion of the risk response plan, the risk response plan for the third risk mitigates the dependency by at least one of delaying the project and accelerating the second project based on a status of the second project.

16. The system of claim 15 wherein the risk management tool promotes executing the portion of the risk response plan by providing a risk assessment form comprising risk register information.

* * * * *